Figure 1:
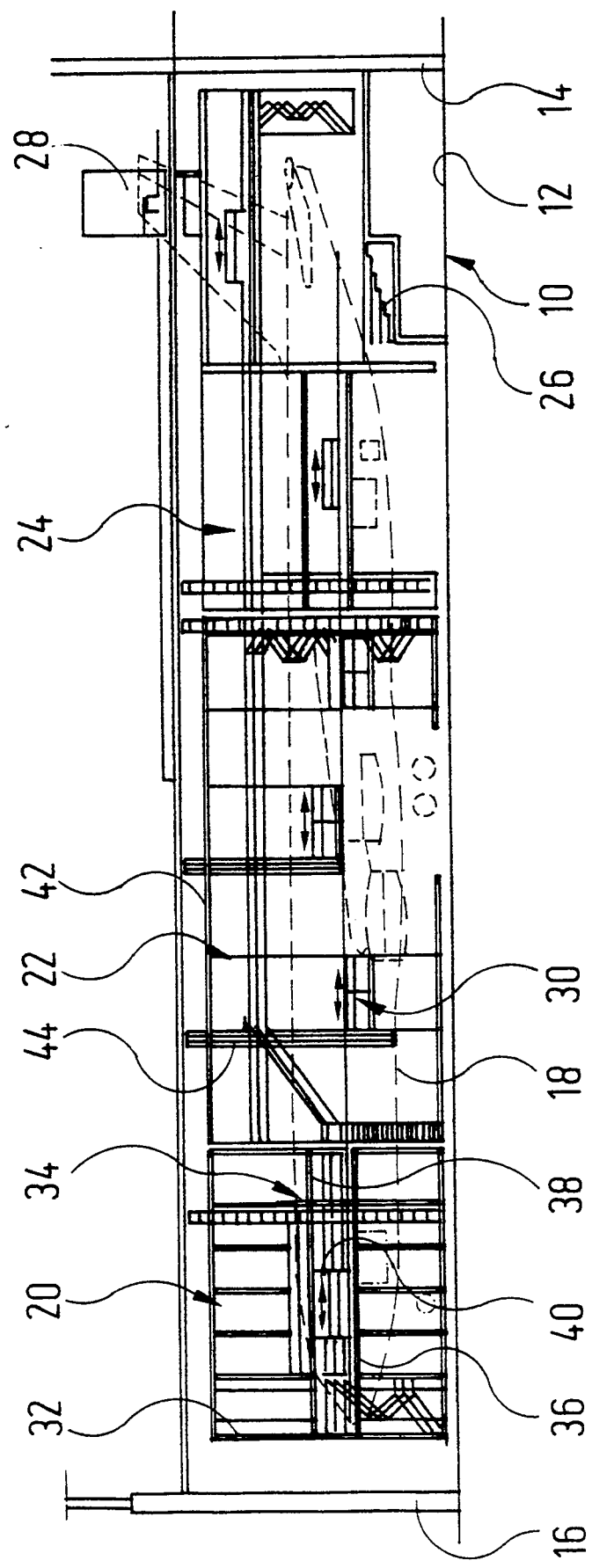

United States Patent [19]
Fahrion

[11] Patent Number: 5,363,940
[45] Date of Patent: Nov. 15, 1994

[54] AIRCRAFT WORK DOCK

[76] Inventor: Otmar Fahrion, Dürerstr. 9,, D-70806 Kornwestheim, Germany

[21] Appl. No.: 102,256

[22] Filed: Aug. 5, 1993

[30] Foreign Application Priority Data

Aug. 11, 1992 [DE] Germany .................. 4256501

[51] Int. Cl.⁵ .................................................. E04G 1/00
[52] U.S. Cl. ...................................... 182/62.5; 182/36; 182/141; 182/115
[58] Field of Search ............... 182/62.5, 130, 141, 182/36, 115, 179, 36

[56] References Cited

U.S. PATENT DOCUMENTS 2,828,166  3/1958  Herring ................. 182/115 X
2,978,062  4/1961  Camillo et al. .......... 182/115 X
3,256,955  6/1966  Izmirian et al. ........... 182/115
5,152,370  10/1992 Silberman ............... 182/141 X Primary Examiner—Alvin C. Chin-Shue

[57] ABSTRACT

In a dock for carrying out work on an aircraft (18), support slides (34) which are carried by support frameworks (20–24, 28) are provided and are adjustable in a horizontal and a vertical direction. The support slides (34) each have guide rails (36, 38), running in which is a bottom section (40) to which a work platform (30) is fastened via two scissor-type linkages. The support slides (34) may be moved into an aligned position so that a work platform support section (40) is movable from one support slide to the other.

15 Claims, 7 Drawing Sheets

AIRCRAFT WORK DOCK

The invention relates to a dock for carrying out work on an aircraft according to the preamble of claim 1.

A dock of said type is described in DE-OS 41 00 648.

By virtue of the present invention, a dock according to the preamble of claim 1 is to be developed in such a way that the work platforms may be exchanged between the support frameworks forming in each case one dock half.

Said object is achieved according to the invention by a dock according to claim 1.

In the dock according to the invention, the guideways provided on the various support slides for bottom sections of work platforms may each be moved at the joints of the support frameworks into an aligned position which establishes a continuous rail connection. Thus, a single work platform may in principle be moved over the entire length of the dock.

In the first place, therefore, a dock may be fitted with a smaller number of work platforms (one or two) in order to save costs (the work platforms are of a mechanically complex design and constitute a substantial portion of the overall cost of the dock). In the second place, it is possible to travel, together with the tools and material situated on a work platform, from one work site on the aircraft to another distant worksite on the aircraft without reloading said tools and materials into another work platform and possibly also moving them some distance across the floor of the hangar in which the dock is set up.

Advantageous developments of the invention are indicated in sub-claims.

The development of the invention according to claim 2 is advantageous in terms of explosion-proof operation. The energy supply to the drive motor of a work platform is effected without sliding contacts and yet it is guaranteed that the work platform may move from one support slide to a support slide positioned so as to abut.

In a dock according to claim 3, it is guaranteed that the work platform, on moving over from one support slide to another, is in each case again supplied with the necessary working fluids.

with a dock according to claim 4, it is always easy to track which work platform is situated on which of the support slides. This is advantageous both in terms of automatic monitoring of the work platform position to avoid collisions with the aircraft and for numerically controlled movement of the work platforms along aircraft contour lines stored in a control computer.

The development of the invention according to claim 5 also offers advantages in terms of position monitoring and automatic travel of the work platforms into successive operating positions.

In a dock according to claim 6, transmission of the signals of the position transducers is also effected reliably and without contact problems.

A dock according to claim 7 is provided with an automatic collision-monitoring system between work platforms and aircraft which is used in addition to the ranging sensors normally provided on the work platforms. Said ranging sensors, however, only become operative as a final emergency measure, whereas the control computer checking the actual position of a work platform against the contour lines of the aircraft is able to recognize an impending collision and take appropriate action.

Usually, work platforms of a dock for carrying out work on an aircraft are each manned by at least two workers, of which one is exclusively responsible for steering the work platform while the other carries out work on the aircraft. In a dock according to claim 8, it is possible to dispense with the worker responsible for steering the work platform because the control computer, after a single learning trip, may carry out further trips on the same type of aircraft unaided.

For many jobs on an aircraft it is necessary to have work platforms Carried by a floor vehicle. The effect achieved by the development of the invention according to claim 9 is that a work platform carried by a floor vehicle may, if need be, also be transferred to a support slide carried by a support framework of the dock. This is once more advantageous in terms of keeping down the total number of work platforms required but also in terms of making it easy to move, together with tools and materials, from one work site to another.

The development of the invention according to claim 10 is advantageous in view of particularly high stability and freedom from play of the strut arrangement which carries the work platform.

The development of the invention according to claim 11 again provides an improvement in the freedom from play and loading capacity of strut arrangements which are capable of extension into a widely projecting configuration. This is desirable because, particularly for painting jobs, a large clearance is required between the aircraft fuselage and the support frameworks to allow as undisrupted as possible an air flow to be conveyed from top to bottom around the aircraft, said air flow entraining paint mist and pollutants.

The development of the invention according to claim 12 guarantees particularly good support and guidance of the support points of the scissor-type linkage on the support rail, combined with ease of movement of the scissor-type linkage.

On an aircraft there are various surfaces which are only slightly inclined, e.g. the wing surfaces which, from the fuselage, gently slope upwards in an outward and forward direction, or the planking of the rudder unit which slopes gently upwards. To maintain a constant clearance in said regions between the work platform and the outer skin of the aircraft, manual steering of the work platform has to be effected very carefully. In a dock according to claim 13, the support slide associated with the work platform in question need be steered only in one coordinate.

To enable docking and undocking of an aircraft in a dock having lateral support frameworks, it is necessary for a support framework associated with the wing region to be laterally displaceable. If, according to claim 14, the direction of movement of said support framework is so selected that the support framework moves, not precisely perpendicular to the dock longitudinal direction, but substantially according to the wing axis, the recess of said support framework, which surrounds the wing, and also the support framework as a whole may then be made smaller. A support framework which is as small as possible and follows the shape of the wing is advantageous because it allows the wing to be tracked particularly well in the dock and at the same time the work platforms are displaceable as far as into the immediate vicinity of the wing roots, even below the middle of the fuselage. Furthermore, said support framework, which is moved more frequently, is lighter in weight. The above-mentioned advantages are achieved with only a marginally increased effort because, in practice, it makes virtually no difference in terms of cost whether the running wheels and the rails cooperating with said wheels are provided precisely at right angles or at an angle of more than 90° to the dock longitudinal axis.

The development of the invention according to claim 15 is once more advantageous in terms of generating an undisrupted air curtain around the aircraft.

Figure 2:
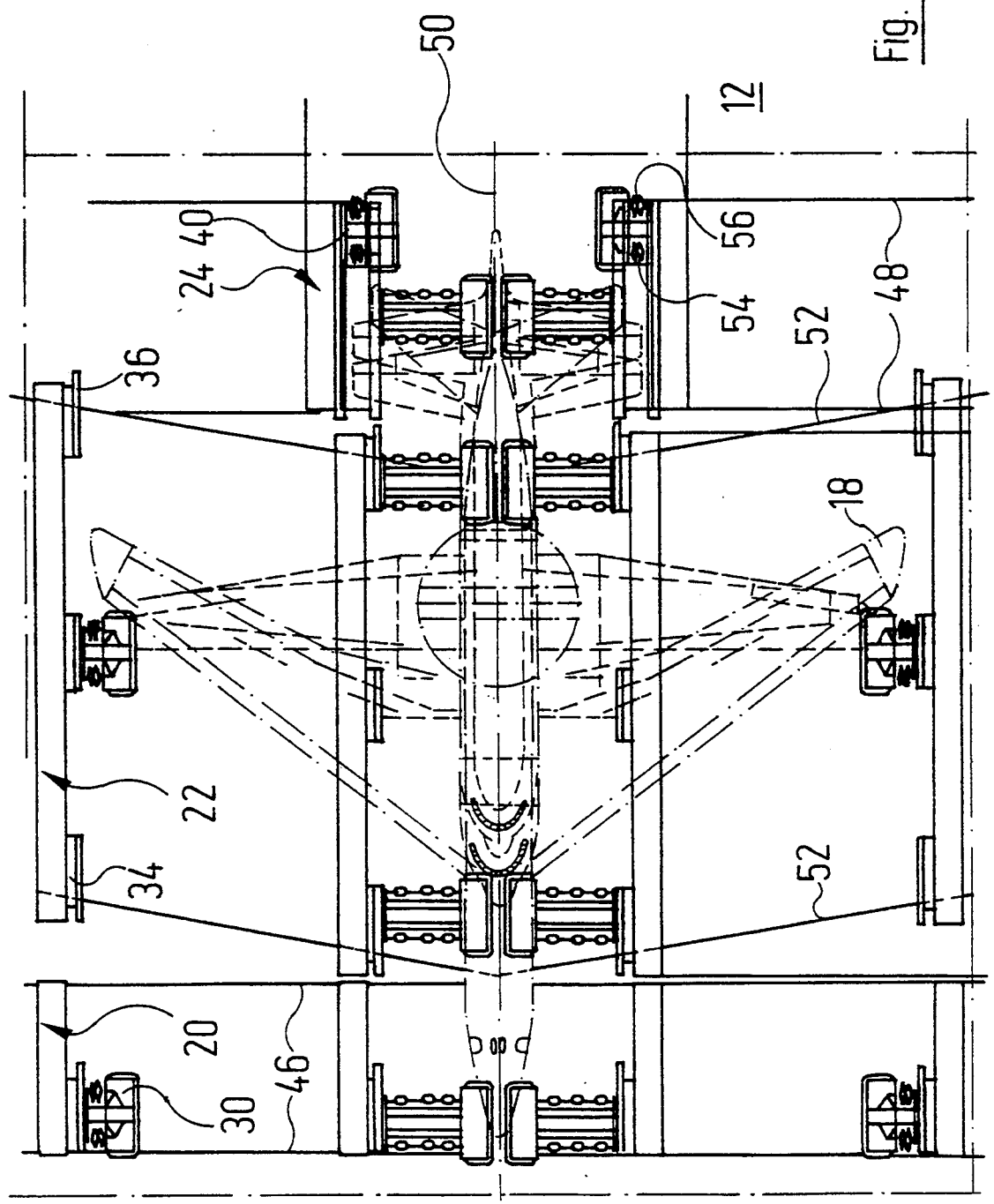
Figure 3:
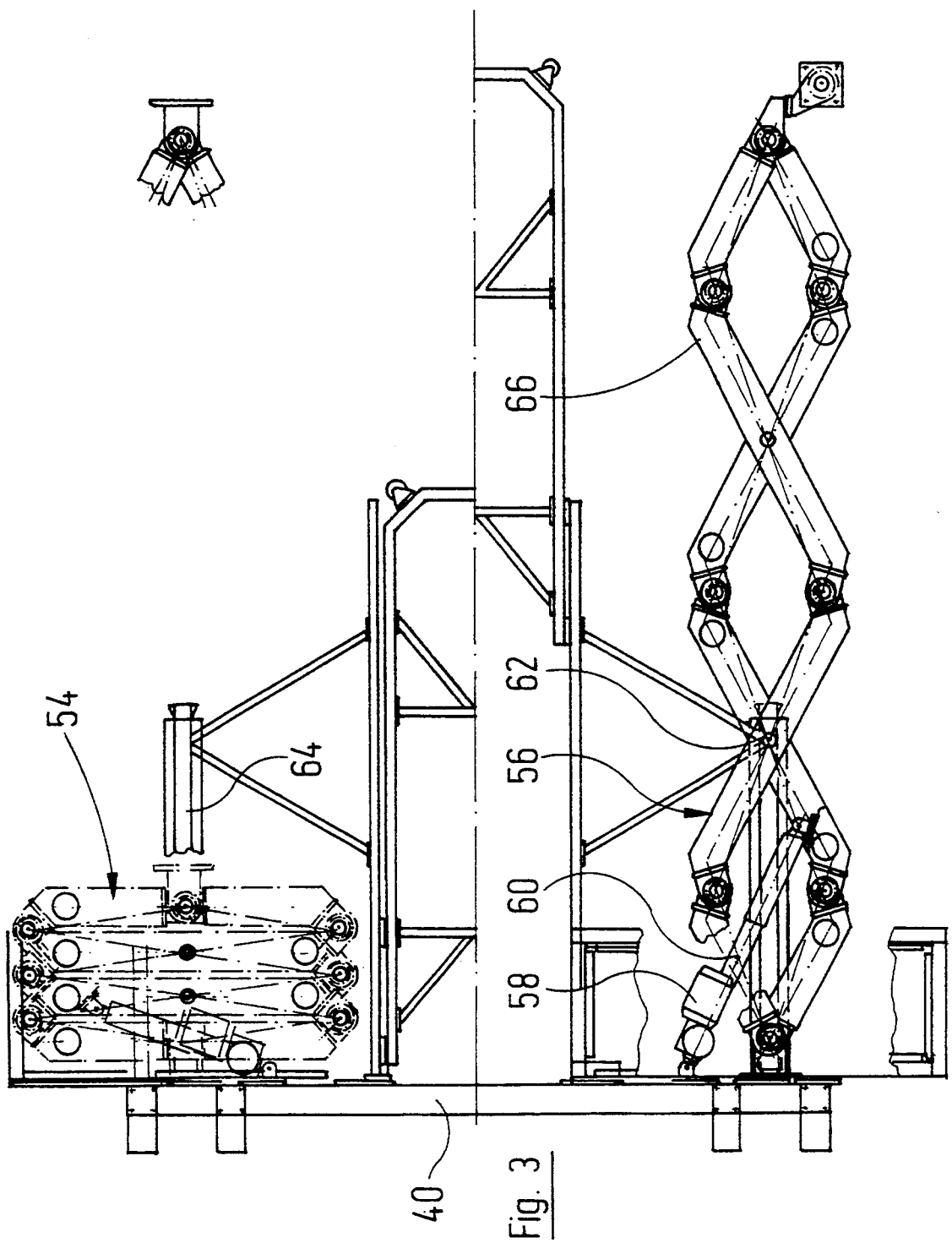
Figure 4:
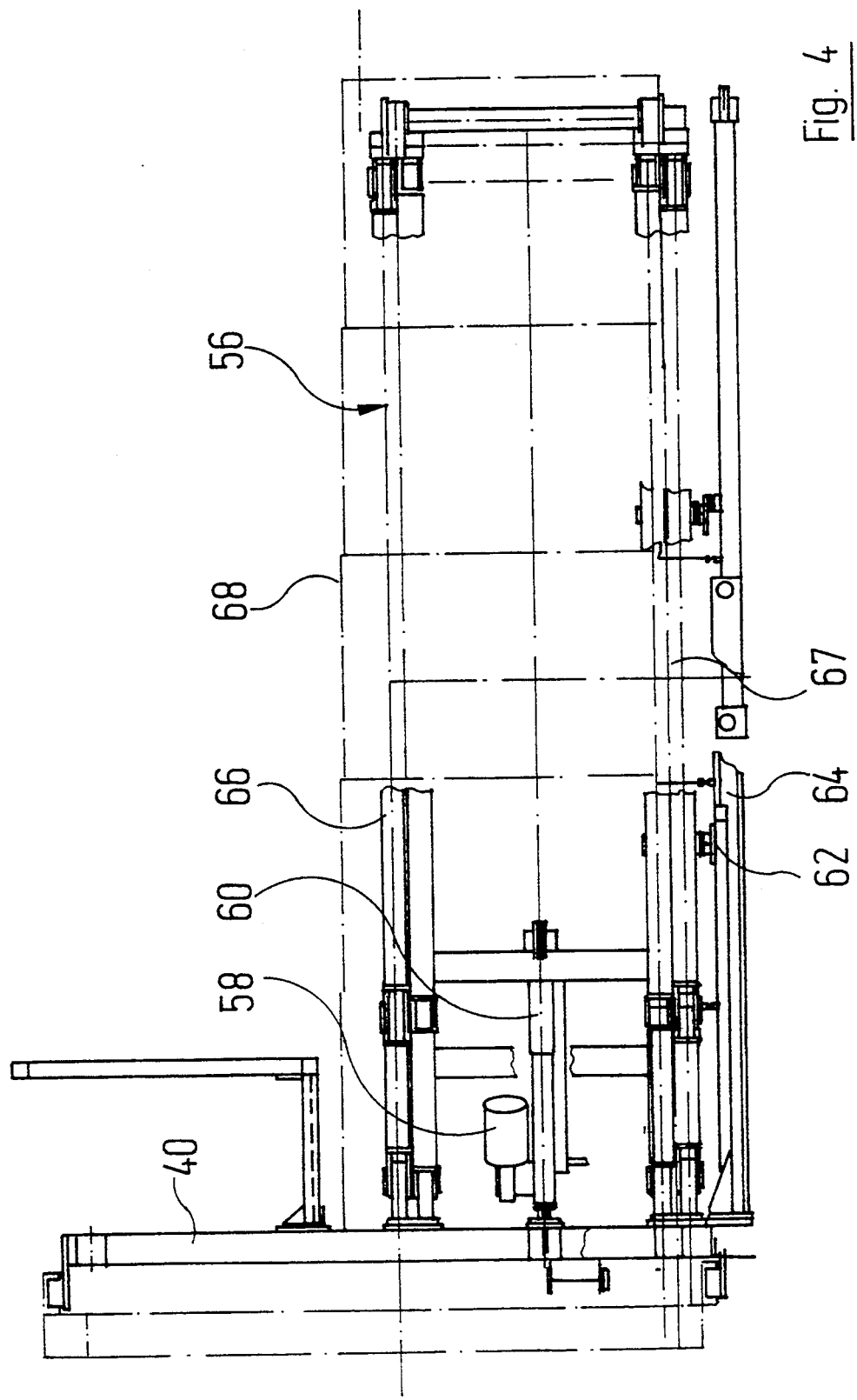
Figure 5:
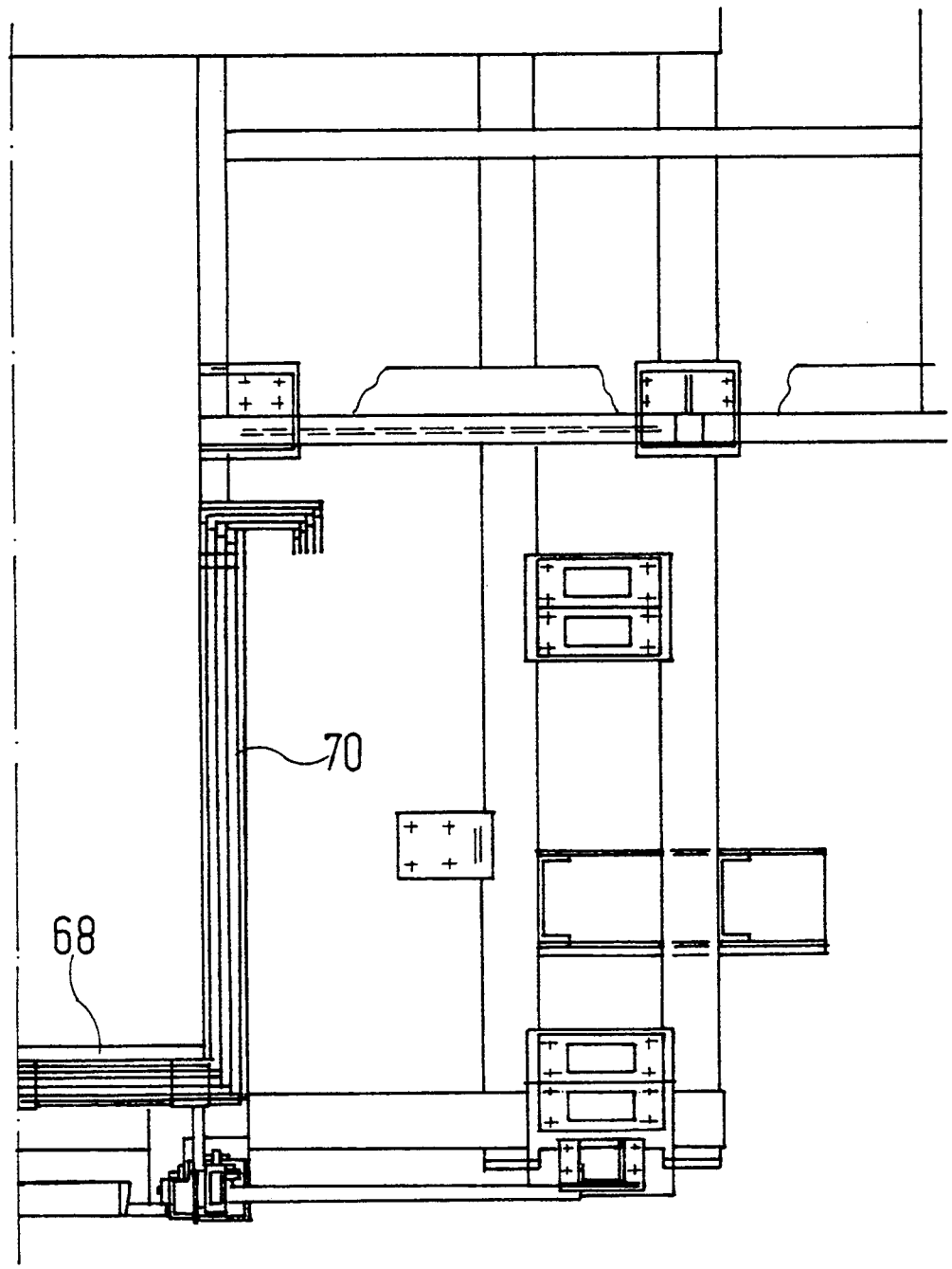
Figure 6:
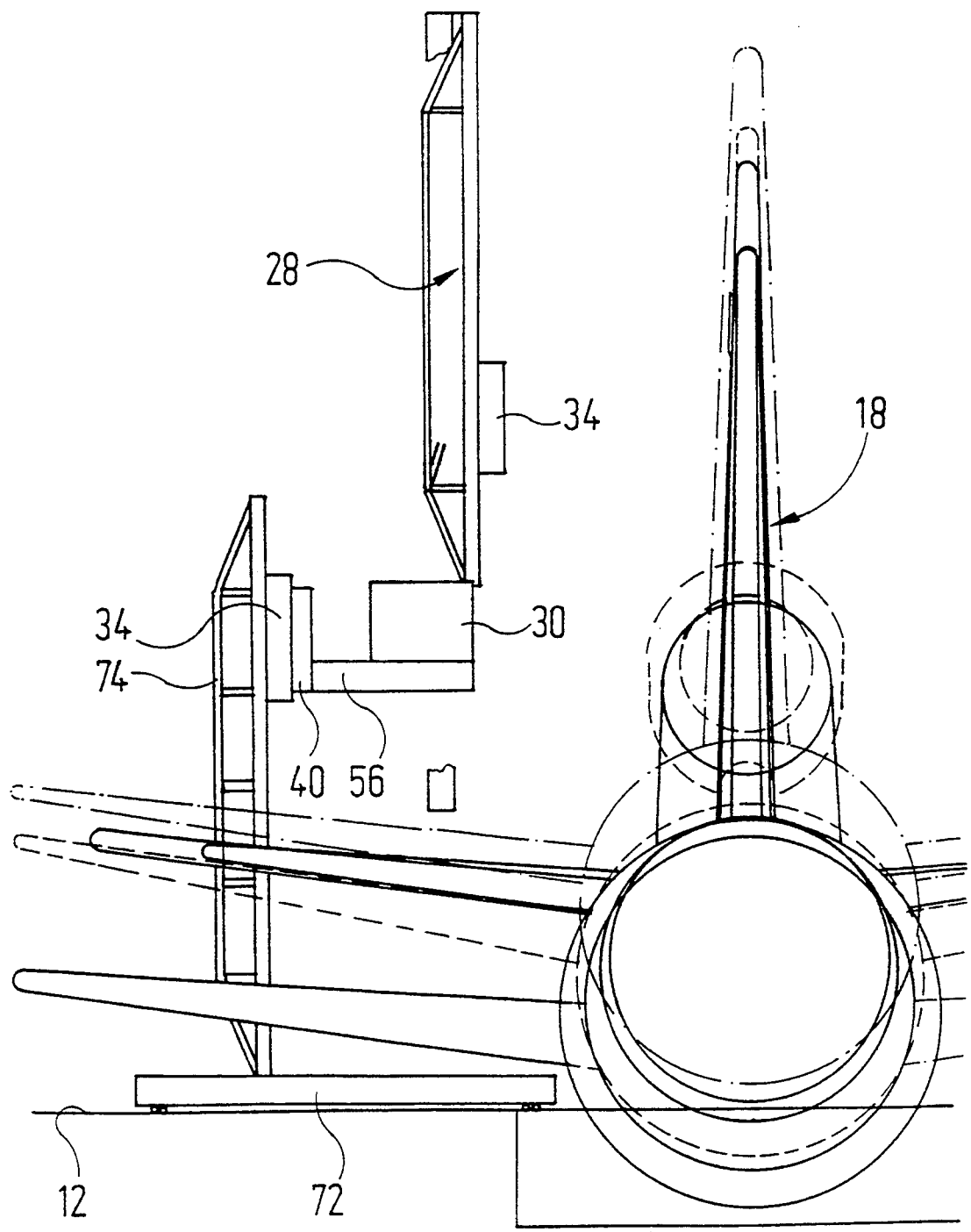
Figure 7:
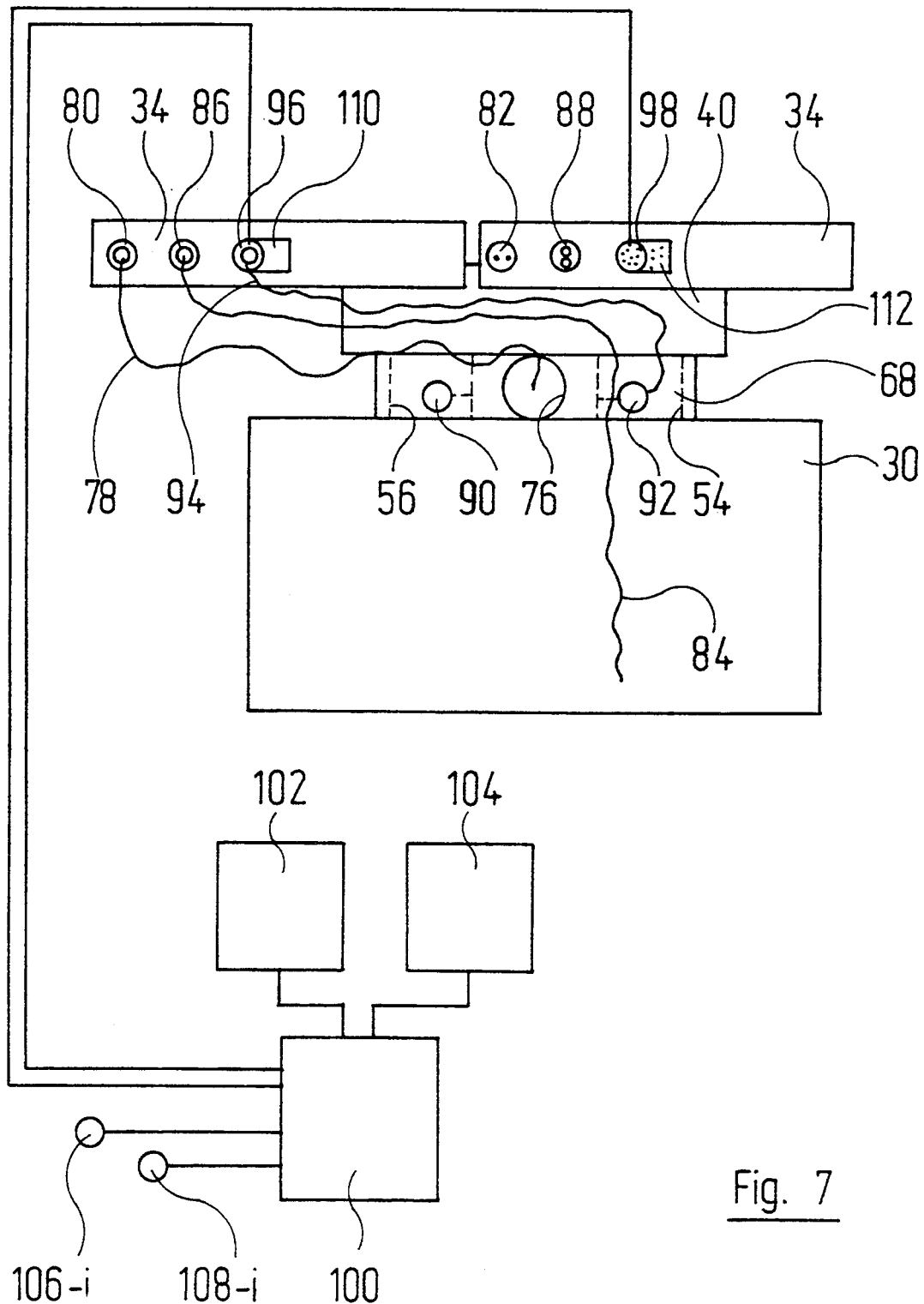

There follows a detailed description of the invention with the aid of embodiments and with reference to the drawings. Said drawings show:

FIG. 1: a diagrammatic section in the longitudinal center plane of an aircraft maintenance hangar equipped with a dock, an aircraft being indicated by dashes;

FIG. 2: a plan view of a similar dock without a rear platform;

FIG. 3: a plan view of a strut arrangement for supporting a work platform of an aircraft dock;

FIG. 4: a side view of the strut arrangement according to FIG. 3;

FIG. 5: a diagrammatic view of a telescopic catwalk for covering the strut arrangement according to FIGS. 3 and 4;

FIG. 6: a diagrammatic view of a floor vehicle, having a work platform which is transferable onto a building-fixed support framework of a dock;

FIG. 7: a diagrammatic view of the energy supply, position measurement and control system for one of the work platforms of the dock.

FIG. 1 shows an aircraft maintenance hangar 10, which has a floor 12, a rear wall 14 and a gate 16.

An aircraft, on which maintenance or painting work is to be carried out, is indicated at 18 by dashes.

To guarantee good access to the outer skin of the aircraft, a dock is set up in the maintenance hangar, said dock being of a mirror-image construction relative to the drawing plane and having a front support framework 20 associated with the nose and the adjacent fuselage section, a middle support framework 22 associated with the wing region, as well as a rear support framework 24 associated with the fuselage section lying behind the wing. Said support frameworks are movable in a direction perpendicular to the drawing plane, with the support frameworks 20 and 22 being laterally displaceable far enough outwards to allow the wing of the aircraft 18 to run past unimpeded.

Associated with the tail region of the aircraft 18 is a rear platform, which as a whole is designated 26 and follows the underside of the fuselage, and in the region of the rudder unit a further support framework 28 is fastened directly to the hangar.

Mounted on each of the support frameworks are work platforms designated as a whole 30, which are movable in a horizontal and vertical direction, as indicated by arrows, and may in addition be moved by a strut arrangement at right angles to the drawing plane.

In the case of the support framework 20, a support slide 34 is guided in a vertically displaceable manner on vertical pillars 32, said support slide in turn having guide rails 36, 38 in which a bottom section 40 for the associated work platform 30 is displaceable.

A similar arrangement is selected for the support framework 24.

The support framework 22 has to operate in the wing region, where it cannot have any vertical pillars reaching down to the hangar floor. For said reason, a strong top horizontal guide rail 42, along which beams 44 run, is provided there. Suspended on each of said beams, again in a vertically adjustable manner, is a support slide 34 which holds the associated work platform 30 in the manner described above.

As is evident from FIG. 2, rails 46 and 48 for the front wheel framework 20 and the rear support framework 24 are let into the floor 12 and extend precisely perpendicular to the dock longitudinal axis designated 50. Rails 52 for the middle support framework 22, on the other hand, are set at an angle of around 105° to the dock longitudinal axis and so correspond to the mean rigging angle of incidence of the wings of different types of aircraft.

As is also evident from FIG. 2, the work platforms 30 are each connected via two scissor-type linkages 54, 56 to the associated bottom section 40 which, as explained above, runs in a horizontally displaceable manner in the associated support slide 34.

As is evident from FIG. 3, an electric motor 58 acting upon a threaded strut 60 is provided for extending and retracting each of the scissor-type linkages 54, 56. In FIG. 3, the top scissor-type linkage 54 is shown in its retracted state and the bottom scissor-type linkage 56 is shown in its extended state.

The middle hinge points 62 of the scissor-type linkages 54, 56 carry roller arrangements (not shown in the drawing) comprising one supporting roller, which rotates about a horizontal axis, and two lateral guide rollers which rotate about vertical axes. Said roller head cooperates with a support rail 64, which is an upwardly open C-section. Thus, the fully extended scissor-type linkage is additionally supported at the first middle hinge point. When the scissor-type linkage is retracted, the other hinge points with their roller heads likewise run onto the support rail 64.

FIG. 4 shows how each of the scissor-type linkages 54, 56 comprises top scissors 66 and bottom scissors 68. A high mechanical loading capacity and freedom from play of the scissor-type linkages 54, 56 is thereby obtained.

Also illustrated by dashes in FIG. 4 is a telescopic walkway 68 providing access from a fixed catwalk 70 disposed on the support section 40 to the work platform supported by the two scissor-type linkages 54, 56.

As is evident from FIG. 5, a telescopic railing 70 is associated with the telescopic walkway 68.

FIG. 6 shows a floor vehicle 72, which carries a support framework 74. Once again there is mounted in a vertically displaceable manner on said support framework a support slide 34, which again carries a work platform 30 via a bottom section 34.

The support slide carried by the floor vehicle 72 may be moved by the floor vehicle into a position in which it is aligned with the vertical guide of the support framework 28, and in said position the bottom section 40 of the associated work platform may be moved into a support slide 34 which is provided on the support framework 28. It goes without saying that the work platform carried by the floor vehicle 72 may, if required, equally be transferred to, or taken over from, one of the support frameworks 20–24.

As is evident from FIG. 6, the individual bottom sections 40 each have an electric drive 76 for moving the work platforms in a horizontal direction along the support slides 34. Connection of said electric drives to trailing supply lines is effected via cables 78 with plugs 80, which are inserted into receptacle outlets 82 provided on the support slides. The length of the cables 78 is so selected that a support section 40 may be moved completely from one support slide to another support slide positioned so as to abut. The plug 80 is then withdrawn and inserted into the receptacle outlet 82 of the adjacent support slide.

Supply of a work platform with compressed air, and possibly low air pressure and possibly hydraulic oil, is similarly effected via a cable 84 having a plug 86 which is insertable into a fluid receptacle outlet 88 of a support slide.

Position transducers 90, 92 are provided for measuring the instantaneous length of the scissor-type linkages 54, 56. The output signals of said position transducers are communicated—possibly together with further data signals (terminal disposed on the work platform for communication with a central control computer)—via a further cable 94 with a plug 96 and via a receptacle outlet 98 provided on the support slide to a central control computer 100. The latter is able to calculate, from the output signals of the position transducers 90, 92, the position of the center of the work platform 30 and the setting angle of the work platform relative to the dock longitudinal axis.

The control computer 100 cooperates with a background memory 102, in which the shape of the aircraft situated in the dock is stored in the form of contour lines placed at a differing vertical distance from the hangar floor by the aircraft skin.

The control computer 100 may therefore check whether there is any risk of the work platform colliding with the aircraft. In the event of such a risk, the control computer may then stop whichever one of the coordinate drives for moving the work platform which, if excitation continued, would cause a collision with the aircraft.

The control computer 100 further comprises a path memory 104 in which, in a learning mode of the control computer 100, the output signals of the position transducers 90, 92 as well as those of further position transducers 106-i, 108-i (only diagrammatically indicated) for the vertical and horizontal position of the various support slides 34-i are stored when the work platform, in a learning cycle, is manually moved in the manner required to carry out specific tasks on the aircraft. The path curve thereby obtained may then be used as a setpoint curve for subsequent work cycles.

The plugs 96 are provided with a lug 110 provided with a marking which identifies the work platform in question, e.g. in a form similar to a punchcard. Similarly, the receptacle outlets 98 have lugs 112 which are provided with a corresponding mark reader. The output signal of said mark reader, together with the data received via the cable 94, is relayed to the control computer 100 which therefore knows which work platform is situated where and which support slide coordinates are to be added in each case to the output signals of the position transducers 90, 92.

I claim:

1. A dock for carrying out work on an aircraft (18), having support frameworks (20-24, 28) which are disposed on either side of the fuselage and of which at least selected frameworks are movable far enough to allow the wing tips of the aircraft to run past them, having support slides (34) which are movable in a vertical and-/or horizontal direction on the support frameworks, and having work platforms (30) which are mounted in each case via a length-adjustable strut arrangement (54, 56) on the support slides (34) and are movable by the strut arrangement (54, 56) in a direction substantially perpendicular to the plane of motion of the support slides (34), wherein the support slides (34) have guideways (36, 38), in which bottom sections (40) for the strut arrangements (54, 56) run, and wherein the guideways (36, 38) of adjacent support slides (34) are movable into an aligned, substantially continuous position.

2. A dock as claimed in claim 1, wherein the bottom sections (40) each have a drive motor (76) for moving the bottom section in the guideways (36, 38) and are connectable via a detachable supply cable (78) to a receptacle outlet (82), by means of which the drive motor (76) is supplied with energy, and wherein the length of the supply cables (76) and the position of the receptacle outlets (82) on two support slides (34) which have been moved together are so adapted to one another that the bottom sections (40) may be moved over the joint of the abutting support slides (34).

3. A dock as claimed in claim 2, wherein the bottom sections (40) are connectable via detachable supply tubes (84) to receptacle outlets (88) for working fluids, and wherein the length of the connection tubes and the position of the fluid receptacle outlets (88) on two support slides (34) which have been moved together are so adapted to one another that the bottom sections (40) may be moved over the joint between abutting support slides (34).

4. A dock as claimed in claim 1, wherein the bottom sections (40) or the work platforms (30) carry mechanically readable identification marks (110) and the support slides have reader units for said identification marks (112).

5. A dock as claimed in claim 1, wherein position transducers (90, 92) are associated with the strut arrangements (54, 56) and further position transducers (106-i, 108-i) are provided for the vertical position and the horizontal position of the support slides (34).

6. A dock as claimed in claim 5, wherein the position transducers (90, 92) associated with the strut arrangements (54, 56) are connectable via a detachable data cable (94) to receptacle outlets (98) which are in turn connected to a control computer (100), and wherein the length of the data cables (94) and the position of the associated receptacle outlets (98) on two support slides (34) which have been moved together are so adapted to one another that the bottom sections (40) may be moved across the joint between abutting support slides (34).

7. A dock as claimed in claim 6, wherein the control computer (100) cooperates with a background memory (102), in which the shape of the aircraft (18) situated in the dock is stored in the form of a set of contour lines, and wherein the computer stops drives for the horizontal movement and the vertical movement of the support slides (34) and drives (76) for the longitudinal displacement of the strut arrangement (54, 56) if the edge of a work platform (30) comes closer than a preset minimum clearance to the contour line in the background memory (102) associated with the instantaneous height of the work platform.

8. A dock as claimed in claim 6, wherein the control computer (100) stores output signals of the various position transducers received during a manually controlled movement of the work platform (30) in a path memory (104) and loads them as setpoint values for a subsequent cycle of motions.

9. A dock as claimed in claim 1, wherein a floor vehicle (72) is provided with a support framework (74) and, running on said framework, a support slide (34) with guideways (36, 38) for a bottom section (40) of an adjustable strut arrangement (54, 56) for a work platform (30), and the support slide of the floor vehicle is movable into a position in which its guideways are aligned with guideways of a support slide (34) carried by a dock support framework (28).

10. A dock as claimed in claim 1, wherein the strut arrangements have scissor-type linkages (54, 56) with in each case two vertically spaced-apart scissors (66, 67).

11. A dock as claimed in claim 10, wherein mounted on each of the bottom sections (40) is a support rail (64), whose free end—when the work platform (30) is retracted—lies below said platform and which supports at least an innermost hinge point of the associated scissor-type linkage (54, 56).

12. A dock as claimed in claim 11, wherein the support rails (64) are upwardly open C-sections, and points of the scissor-type linkages (54, 56) which cooperate with the support rails (64) are provided with a supporting roller, which runs on the bottom of the section and rotates about a horizontal axis, as well as with guide rollers, which cooperate with limbs of the section and rotate about a vertical axis.

13. A dock as claimed in claim 1, wherein a vertical guide frame or a support slide, which is used in the wing region or the tail unit region of the aircraft (18), is tilted according to the inclination of the aircraft skin in said region or the tight is correspondingly adjustable.

14. A dock as claimed in claim 1, wherein running wheels of the support framework (22), which is associated with the wing region of the aircraft (18), and rails (52) for said running wheels are set at an angle of more than 90° relative to the dock longitudinal axis (50).

15. A dock as claimed in claim 1, wherein the floor of the work platforms (30) and walkways (68) provided above the adjustable strut arrangements (54, 56) take the form of grids.

* * * * *